Nov. 11, 1958 J. W. GREIG 2,859,795
LAMINATED TRIM SHEET AND METHOD OF MAKING SAME
Filed Dec. 27, 1955 2 Sheets-Sheet 2
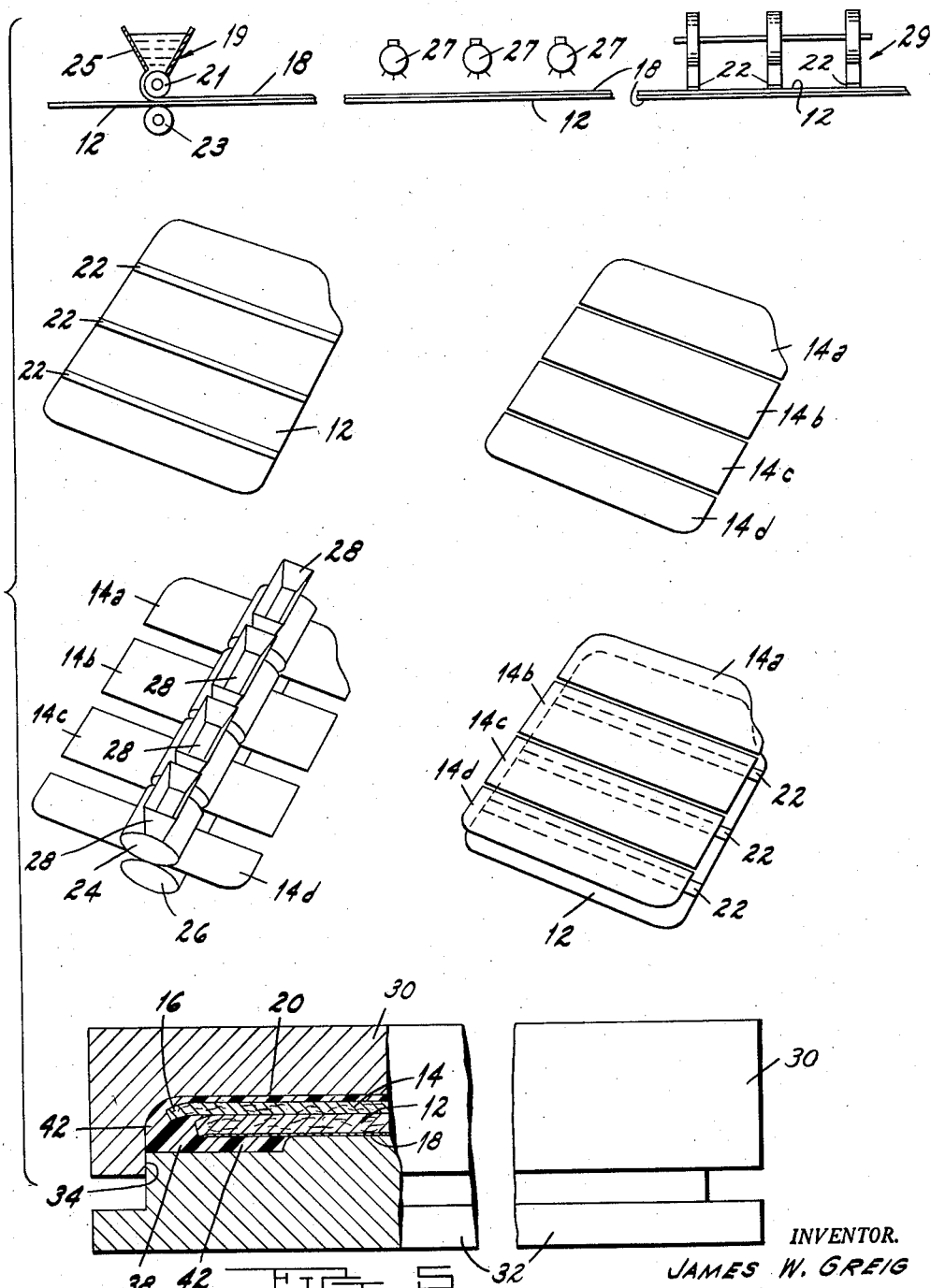
INVENTOR.
JAMES W. GREIG
BY
Burton & Parker
ATTORNEYS United States Patent Office 2,859,795
Patented Nov. 11, 1958

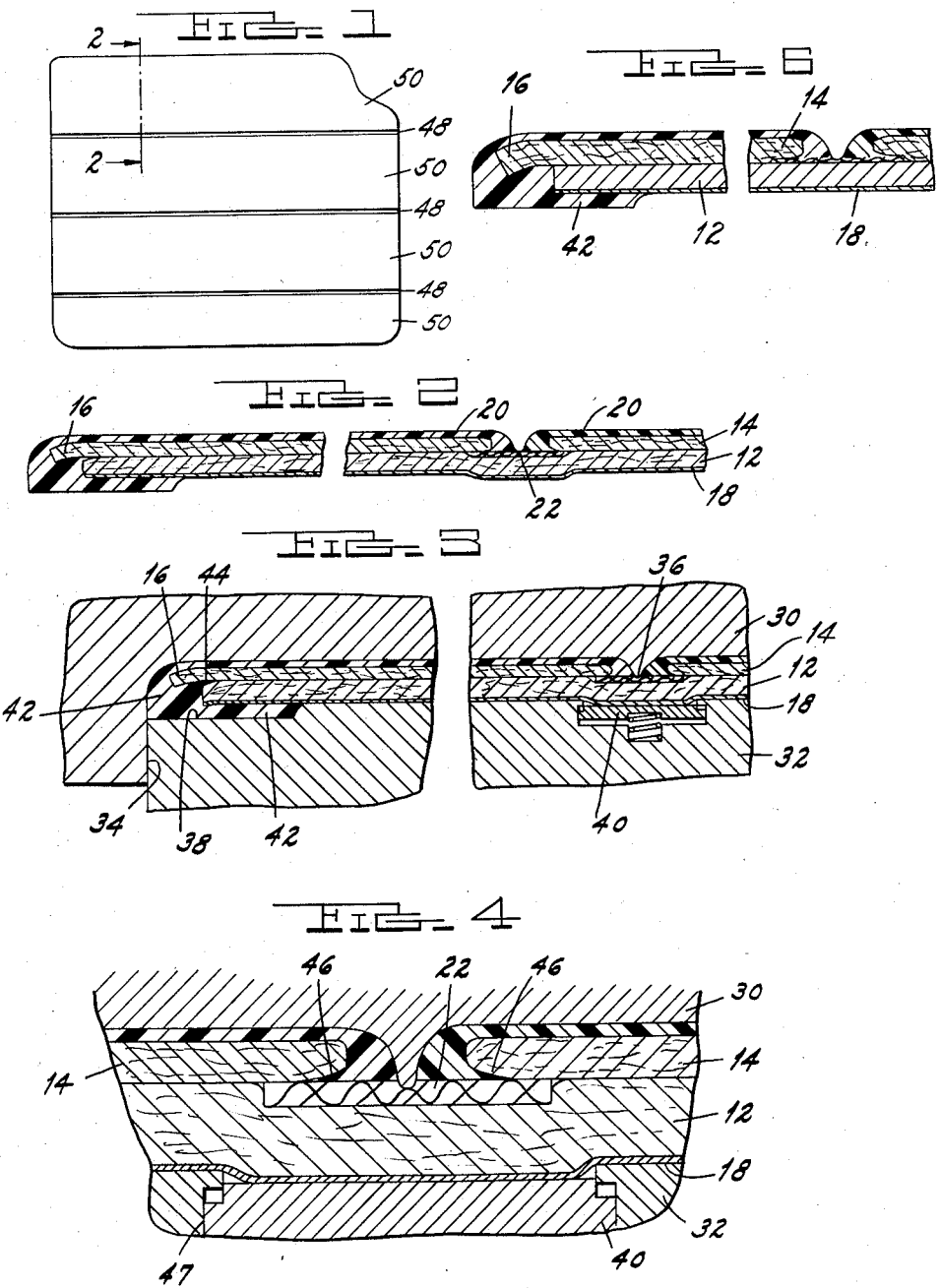

2,859,795

LAMINATED TRIM SHEET AND METHOD OF MAKING SAME

James W. Greig, Grosse Pointe Park, Mich., assignor to Woodall Industries, Incorporated, Detroit, Mich., a corporation of Michigan Application December 27, 1955, Serial No. 555,459

5 Claims. (Cl. 154—110)

This invention relates to laminated structures and particularly to those which present an upholstered appearance, such as automotive trim panels or the like, and to a method of fabricating the same.

An object of the invention is the provision of a trim panel, trim sheet or the like, comprising a foundation layer provided with an outer finish surface layer of plastic material which finish layer of plastic material exhibits a plurality of separate embossed surface areas, and which separate embossed surface areas may be of different colors, or may exhibit different designs. Each plastic layer on each surface area is solidified from the liquid into the solid state in situ upon the foundation and the several area layers are so solidified at one and the same time and in the same operation. The separate embossed areas are permanent parts of the trim sheet or panel and they are defined by debossed lines.

Heretofore panels exhibiting embossed areas have been formed by gluing, stitching, or otherwise securing a trim sheet or layer to a foundation board or ply with wadding interposed between the trim sheet and the foundation board. The trim sheet was secured to the foundation by stitching or by gluing through the wadding along compacted lines. The compacted lines formed by the stitching or gluing served to define the edges of the embossed areas. If the embossments were to be of different colors, pieces of different colored trim material were stitched or glued over the separate wadding areas.

I have departed from the foregoing practices and provide a trim panel or sheet comprising a foundation layer, one surface of which is substantially completely covered with tough, flexible, long wearing plastic. Such plastic cover layer exhibits separately defined embossed areas. These separate areas may present different designs and may be of different colors. The plastic cover layer, however, is formed by being flowed in the liquid state over the several separate areas of the foundation. It is formed and cured under heat and pressure in situ thereon. The entire panel presents a unitary appearance and constitutes a unitary structure. The plastic layer is fused in situ upon the foundation layer simultaneously throughout the several areas.

I provide a foundation layer including a base ply and a plurality of laterally spaced apart individual soft cushion-like wadding plies or mats overlying the base ply. Each wadding mat is coated upon its exposed surface with a layer of plastic which plastic is formed and cured from the liquid to the solid state in situ upon the mat. The plastic extends over the edge of the mat and bonds the mat to the foundation ply.

The foundation layer or mat may be a flexible fibrous layer and the wadding mats may be flexible whereby the complete sheet or panel is relatively flexible. On the other hand the foundation layer may be a stiff fiber board with the wadding mats secured thereto. In such case the complete assembly while presenting an upholstered appearance is relatively stiff.

An important feature is that the plastic coating over each wadding mat may extend as a thick marginal portion or reinforcement over the edge of the mat and thereunderneath where it is bonded directly to the foundation layer. Each mat may be bonded to the foundation layer only around the margin of the mat whereby limited relative displacement of the material of the mat and foundation layer is permitted. The lines of separation between the mats constitute debossed lines in the face of the laminated trim sheet. These debossed lines outline embossed areas formed by the mats. Such mats are commonly of different colors and commonly termed color mats.

Another object of the invention is the provision of a trim sheet of the character hereinabove described wherein the debossed lines of separation between separate embossed areas constitute sharp lines of color demarcation. Such sharp lines of color demarcation may be produced by providing a foundation layer so formed or treated along such debossed lines as to inhibit the commingling of different color areas. The foundation ply may be treated with a sealer coat or strips of relatively nonabsorbent tape may be applied thereto over line areas of intended separation between adjacent edges of adjacent wadding mats. The plastic layer covering each wadding mat extends over the edge of the mat and onto the tape and bonds the mat through the tape to the foundation ply. Due to low absorptive capacity the tapes serve to inhibit intermingling of the plastic layers along adjacent edges between adjacent wadding mats. This is important where the plastic coats on the several mats are of different colors. The tapes also serve to reinforce the foundation ply along lines between the wadding mats.

Another object is the provision of a process for fabricating trim panels or sheets which process comprises: coating one surface of a plurality of soft cushion-like fibrous wadding mats with a liquid plastic; placing the coated mats spaced apart upon a foundation layer with the plastic-free surfaces of the mats abutting the foundation layer; heating the plastic coating on the several mats to render it flowable and flowing the liquid plastic under the influence of heat and pressure over the mats and about the edges thereof and onto the foundation layer adhesively bonding the same thereto; preventing, during the flowing and bonding operation, the plastic from one mat from commingling with the plastic of an adjacent mat; and thereafter curing the plastic in situ upon the mats and upon the foundation layer from the liquid into the solid state.

The flowing of the plastic upon the mats and about the edges thereof over and onto the foundation layer securing the mats thereto and casting the plastic in situ upon the several mats is carried out as one operation and at the same time.

Other objects, advantages, and meritorious features will more fully appear from the specification, claims, and accompanying drawing, wherein:

Fig. 1 is a plan view of an automotive door trim panel embodying my invention;

Fig. 2 is a cross sectional view taken on the line 2—2 of Fig. 1;

Fig. 3 is a cross sectional view through the platens of a press showing the formation of my improved trim panel between the platens;

Fig. 4 is an enlarged cross sectional view through the platens of a press between which my improved panel is formed, taken through the adjacent edges of two color mats;

Fig. 5 illustrates the various steps in the fabrication of my improved trim panel; and Fig. 6 is a cross section of a sheet similar to that shown in Fig. 2 but wherein the foundation layer is relatively stiff.

This application is a companion case to co-pending application, Serial No. 463,580 filed October 20, 1954. The same general process set forth in said co-pending case is followed herein.

The foundation layer is shown as comprising a base ply 12 and soft, cushion-like fibrous wadding ply strips or mats 14. These mats 14 may be formed of paper, felt, or other suitable wadding-like material. In Figs. 2, 3, and 4, the base ply is formed of soft cushion-like material. In Fig. 6, the foundation ply 12 is shown as formed of stiff material such as cardboard, fiberboard, or the like.

The foundation ply 12 is cut to a marginal shape conforming roughly to the shape of the desired finished product. When both the foundation ply 12 and the mats 14 are of soft, cushion-like material, as in Figs. 2-4, the lower or fundation ply 12 may be of somewhat greater thickness than the upper plies or mats 14 because both serve to impart the upholstered appearance to the embossed areas. In Fig. 6, where the foundation ply is stiffer, the color mats may be of equal or greater thickness than the foundation ply as they alone furnish the padded effect.

If desired, the mats 14 may be adhesively secured throughout their entire areas to the foundation layer, instead of being secured thereto only about their margins by their plastic finish layers as above described. The thickness of the plies may vary from 1/16" to 1/8" or 1/4" or more as to each ply.

In the embodiment shown in Fig. 5, four separate color mats are indicated at 14a, 14b, 14c, and 14d. These mats are cut to shapes as desired for the color areas in the finished product. Following coating upon the upper surface with liquid plastic, each mat is placed upon the foundation ply 12 with uncoated surface down against ply 12. In Figs. 2 and 3 at 16, the mats are shown as extending somewhat beyond the edges of the foundation ply. The portion 16 of the mat may be bent downwardly slightly, as shown in Figs. 2 and 3, to conform somewhat to the curvature of the surface of the plastic at the edge of the panel when the same is finished.

As described in my co-pending application supra, the under surface of the foundation layer 12 is coated with a liquid plastic film 18. The plastic film 18 may be applied by a roll coating device indicated schematically in Fig. 5 at 19. The roll coating device includes upper roll 21 and lower roll 23. A reservoir of liquid plastic 25 is disposed in feeding engagement with the upper roll 21. As ply 12 is passed between the rolls, a plastic film 18 is deposited thereupon. The plastic is then cured in an oven indicated schematically at 27 as the ply 12 provided with the coating is passed through the oven.

Each of the color mats is coated upon one surface with a liquid plastic layer 20, which is preferably a thicker coating than the film 18. The liquid plastic upon the color mats may vary in color from one mat to the other such that the finished trim panel will exhibit areas of different colors. The plastic film upon the underside of the foundation mat may be of the same plastic material as the coating upon the color mats and the plastic layers on the different color mats are preferably of the same plastic composition except for variation in pigment. Prior to the coating of the plies or mats they are thoroughly dried free of materials volatile at or below the curing temperature of the plastic coating. Such drying is to prevent the formation of bubbles in the coating.

Plastic that I have found desirable is of that class termed plastisol. Plastisol may be defined as a dispersion or intimate mixture of vinyl resin in a liquid plasticizer with appropriate stabilizers, pigments and other modifiers added. At room temperature plastisol is a liquid before it has been fused into the solid state. Plastisol is converted from the liquid to a solid form by heat. Such conversion is termed a paste-fusion step in the plastic industry. The requirement for this step is that the dispersion be heated to the critical temperature. A plastisol composition which has been found satisfactory is as follows:

FORMULA "A"

*Flexible plastisol*

THERMOPLASTIC

| | Percent |
|---|---|
| Pigment, such as Supercarbovar paste or titanium dioxide paste | 12.2 |
| Filler (calcium carbonate) | 12.0 |
| Stabilizer DS-207 (lead salt) | 1.0 |
| Wetting agent—(Triton X-100) | .5 |
| Plasticizer, Di-iso-octyl-phthalate | 18.3 |
| Plasticizer, Tetra hydro furfuryl oleate | 13.0 |
| Polyvinyl chloride resin (Geon-121) | 43.0 |
| | 100.00 |

Such plastisol composition fuses to the solid state in about one minute upon reaching a temperature of 350°. At lower temperatures the fusing from the liquid to the solid state is slower. Additional formulations may be used, if desired, such as:

FORMULA "B"

*Rigid plastisol*

THERMOPLASTIC

| | Percent |
|---|---|
| Pigment in polyester resin | .3 |
| Tri-octyl-phosphate plasticizer | 2.0 |
| Polyester resin | 17.8 |
| Staflex KA-plasticizer | 10.8 |
| ATC catalyst (benzoyl peroxide) | .2 |
| Dythal—lead stabilizer | 2.0 |
| Calcium carbonate filler | 11.4 |
| Vinyl copolymer resin (Geon 202) | 11.5 |
| Polyvinyl chloride resin (Geon 121) | 44.0 |
| | 100.00 |

FORMULA "C"

*Thermosetting resin*

| | Percent |
|---|---|
| Polyester resin—known in trade such as Paraplex P-47 and P-13 | 80.0 |
| Filler such as calcium carbonate | 16.4 |
| Catalyst—ATC (benzoyl peroxide) | 1.6 |
| Pigment—such as a color paste | 2.0 |
| | 100.0 |

Inasmuch as only surface penetration of the ply or cushion mat by the plastic is desired, the viscosity of the plastic may be varied depending upon the absorptive capacity of the mat. Such viscosity may be varied by varying the proportion of vinyl resin particles plus other solid ingredients such as fillers or pigments relative to the proportion of plasticizer used. This prevention of undue absorption of plastic by the ply or mat may be accomplished by applying a prime or sealer coating of a material such as latex or other like product to the surface of the mat. Such sealer coat inhibits absorption of plastic by the mat. In the fabrication of my improved trim panel and the carrying out of the process of its fabrication, I have found that a viscosity approaching that of free-flowing molasses is satisfactory.

In applying the plastisol to the color mats, the mats are run between the superposed rollers 24 and 26 of a roll coating machine. Disposed above the upper rollers 24, of the roll coater, are liquid plastic reservoirs 28 from which the liquid plastic is discharged over the rollers 24 and onto the color mats 14. Prior to coating, the plastisol mass may be subjected to vacuum to withdraw air therefrom so as to inhibit formation of air bubbles therein. Each plastic containing reservoir may hold liquid plastic of a different color.

If desired, relatively narrow strips of relatively non-absorbent tape 22 may be so placed upon the foundation ply along the lines of intended separation of the different embossed areas defined by the color mats so that the edges of the color mats will overlie the edges of the tapes as shown in Figs. 2, 3, and 5. The tapes may be secured to the foundation layer either by applying adhesive to the tapes or to the foundation ply prior to placing the tapes thereon. The tapes may be made of closely woven fabric or may be of a cured or partially cured plastic material, or may be of any other suitable strong and relatively non-absorptive material. Because of low absorptive capacity the tapes aid in inhibiting the plastic from one color mat from flowing into and intermingling with the plastic of adjacent color mats. The tapes also serve to strengthen and reinforce the foundation layer between the adjacent color mats. These tapes may be of different colors either to blend or to contrast with the colors of the plastic on the color mats.

If the foundation ply is relatively non-absorbent of plastic along lines of intended separation between adjacent color mat areas, either because of its character or its treatment, tapes may still be used to strengthen the sheet. Instead of using the tapes throughout the full length of the lines of intended demarcation between the mats, short lengths of tape may be used only at the ends of such lines to reinforce the sheet at the margins.

After the color mats have been coated with plastic by the roll coater, they are placed upon the foundation ply in laterally spaced apart relation, and as shown in Figs. 2–5 with the adjacent edges of the color mats overlying the tapes 22. The assembly of color mats, foundation ply and liquid plastic coating is then placed between the dies or platens 30 and 32 of a press. The dies are heated in any convenient manner such that they are adapted to bring the liquid plastic to the required temperature. At a temperature of 350° F. the plastic composition first above set forth fuses and cures.

The upper die exhibits a recess 34 into which the lower die moves to close upon the multi-ply trim panel. The upper die also exhibits a plurality of depending ridges 36. Only one ridge 36 is shown in Fig. 3. The lower die is cut away upon its meeting face and about its margin, as shown in Fig. 3, to exhibit a countersunk shoulder 38. The lower die is also cut away opposite the ridges 36 of the upper die. Within these cutouts of the lower die opposite the ridges 36 are disposed spring mounted pressure pads 40 adapted to cooperate with the ridges 36 in a manner hereinafter described.

As the dies close upon the color mats and superimposed foundation ply, the liquid plastic 20 is flowed over the upper surface of the mats and around the outer edges thereof and around the outer margin of the lower ply 12 all as shown at 42 in the drawing. It flows over the countersunk shoulder 38 and underneath the foundation ply to be bonded to the plastic film 18 on the under surface of the foundation ply. It will be noted that the plastic 20 therefore completely encloses the marginal edges of the color mats and foundation ply. The plastic penetrates the color mats and foundation ply sufficiently to mechanically bond therewith and to bond the color mats to the foundation ply. The plastic covering the marginal edges of the mats is of relatively greater thickness than that covering the upper surface of the mats. Such marginal edge coating of plastic, after being cured, serves to hold the foundation ply and color mats together. It also reinforces and strengthens the margin of the assembly.

Some of the plastic 20 is forced between the meeting faces of the color mats and foundation ply adjacent to the marginal edges of the foundation ply as shown at 44 in the drawings. This plastic which is forced between the meeting faces of the color mats and foundation ply adjacent to the edge of the foundation ply serves to improve the mechanical bond between the mats and strengthens and reinforces the edges of the sheet.

As the two dies close upon the multi-ply assembly as shown in Fig. 3, the ridges 36 of the upper die engage and bear down upon the tapes 22. The tapes are held upwardly against the ridges by the spring urged pressure pads 40 bearing against the under surface of the foundation ply 12. Such tapes act as gaskets and form plastic flow barriers between the color mats, thereby preventing plastic from one color mat from flowing into and intermingling with the plastic of an adjacent color mat. As the two dies are urged more closely together, the liquid plastic 20 flows over the surfaces of the color mats and against the ridge 36 and down upon the tape 22 and under the marginal edges of the lower surfaces of the color mats as shown in Fig. 4 at 46. A small amount of plastic penetrates the tapes to mechanically bond the plastic thereto but the tapes are of a character to resist such flow of plastic therethrough as would produce commingling.

Under the pressure of ridge 36 the foundation mat is pressed downwardly upon the pressure pad 40, as at 47. The debossed lines thereby formed in the upper surface of the panel are indicated at 48 in Fig. 1. Such debossments, together with the separation of the plastic on one color mat from the plastic on adjacent color mats, gives the upper surface of the panel the effect of having embossed or padded differently colored surface areas as at 50. It will be noted that a greater thickness of plastic exists over the edges of the color mats than upon the upper surfaces thereof. This increased thickness of plastic not only protects the edges of the color mats and also provides a larger area of plastic adhesion to the foundation ply, but as the plastic is cast into such form, these increased thickness areas along the debossed lines impart a permanence to such lines of separation which outline the embossed areas. This permanence of debossment is exceedingly important to the appearance of embossment required for the upholstered or padded panel.

After the mats and plastic have been formed between the platens of the press to the shape shown in Figs. 2–4, they are held there a sufficient length of time to cure the plastic in situ on the mats. Thereafter the press is opened and the finished product removed from between the platens.

The molding surface of the upper die 30 of the press may be provided with an engraving surface, not shown, into the cavities of which the liquid plastic 20 is cast to impart to the embossed surface areas of the plastic layer an engraved design. Each of the plastic layers covering the color mats may be suitably engraved. The separate color mats may therefore represent differently embossed and differently colored upholstered areas.

What I claim is:

1. A laminated decorative trim sheet comprising, in combination, a foundation ply, a plurality of cushiony mats superposed upon separate spaced apart areas of one surface of the foundation ply, an outer finish layer of cast plastic for each mat, each of said outer finish plastic layers having a cast self-supporting dished shape comprising a planar bottom portion and a marginal flange portion, each of said finish layers being cast in situ over its mat with the bottom portion overlying the face of the mat and the marginal portion encircling the margin of the mat, said plastic layer being adhesively bonded to the surface of the mat but not appreciably impregnating the interior of the mat, said marginal flange portion of the plastic layer being adhesively bonded to the foundation ply about the margin of the mat.

2. A laminated decorative trim sheet as defined in claim 1 characterized in that the marginal flange portion of each finish layer has a thickness substantially greater than the thickness of the planar bottom portion of the layer and has a part extending inwardly underneath the marginal portion of the mat and bonded to the underside of such marginal portion and to the foundation ply underneath the mat.

3. A laminated decorative sheet as defined in claim 1 characterized in that certain of the mats are disposed adjacent to the margin of the foundation ply and the marginal flanges of the cast plastic finish layers which cover said marginally disposed mats and which extend over the margins of the mats extend also over the margin of the foundation ply and there-underneath and are adhesively bonded to the underside of the foundation ply, and a layer of plastic extends over and is adhesively bonded to the underside of the foundation ply and to the marginal flange portions of said plastic layers which cover the mats and extend onto the underside of the foundation ply.

4. A laminated decorative trim sheet comprising, in combination, a foundation ply, a plurality of cushiony mats superposed upon separate spaced apart areas of the surface of the ply, strips of tape secured to said surface of the ply and outlining said separate spaced apart areas and underlying margins of the spaced apart mats, a cast outer finish layer of plastic overlying each mat and having a cast self-supporting marginal flange surrounding the margin of the mat and bonded thereto and to the tape along said margin of the mat, the marginal flanges of plastic layers covering adjacent mats being spaced from each other by portions of said tape.

5. That process of forming a multi-ply sheet comprising, coating one surface of each of a plurality of individual mats of soft wadding with a liquid plastisol, placing the mats spaced apart on the surface of a foundation ply with the coated surface of each individual mat exposed, flowing and fusing the plastic coating on the several mats over the mats and about the margins of the mats and onto the foundation ply about said margins carrying out said flowing and fusing underneath a heated die superimposed over the mats and encircling the margins of the mats and maintaining flow preventing barriers between the several mats while carrying out said fusing and flowing preventing the plastic coating from one mat from flowing over into the plastic coating of another mat, thereby forming separate cast plastic layers over the several separate mats and adhesively bonding each plastic layer about the margin of its mat to the foundation ply.

References Cited in the file of this patent
UNITED STATES PATENTS

| | | |
|---|---|---|
| 1,919,059 | George | July 18, 1933 |
| 2,150,030 | Haberstump | Mar. 7, 1939 |
| 2,291,545 | Ganz et al. | July 28, 1942 |
| 2,302,342 | Nast | Nov. 17, 1942 |
| 2,335,222 | Storch | Nov. 23, 1943 |
| 2,581,195 | Lyijynen | Jan. 1, 1952 |
| 2,618,581 | Lyijynen | Nov. 18, 1952 |
| 2,665,132 | Robinson | Jan. 5, 1954 |
| 2,674,559 | Zobel | Apr. 6, 1954 |
| 2,725,271 | Cunningham | Nov. 29, 1955 |
| 2,729,010 | Markus et al. | Jan. 3, 1956 |
| 2,756,524 | Kleinsorge | July 31, 1956 |
| 2,782,465 | Palmer | Feb. 26, 1957 |

FOREIGN PATENTS

| | | |
|---|---|---|
| 547,637 | Great Britain | Sept. 4, 1942 |
| 706,109 | Great Britain | Mar. 24, 1954 |